United States Patent
Yamashita et al.

(10) Patent No.: US 9,300,886 B2
(45) Date of Patent: Mar. 29, 2016

(54) SOLID-STATE IMAGING DEVICE WITH SWITCH ELEMENTS PROVIDED BETWEEN VERTICAL SIGNAL LINES AND INTERCONNECTS

(71) Applicant: KABUSHIKI KAISHA TOSHIBA, Minato-ku (JP)

(72) Inventors: Hirofumi Yamashita, Kawasaki (JP); Hisayuki Taruki, Oita (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 34 days.

(21) Appl. No.: 14/200,889

(22) Filed: Mar. 7, 2014

(65) Prior Publication Data
US 2015/0077611 A1    Mar. 19, 2015

(30) Foreign Application Priority Data
Sep. 13, 2013  (JP) .................................. 2013-191137

(51) Int. Cl.
*H04N 5/355*  (2011.01)
*H04N 5/3745*  (2011.01)

(52) U.S. Cl.
CPC ......... *H04N 5/3559* (2013.01); *H04N 5/37452* (2013.01); *H04N 5/37457* (2013.01)

(58) Field of Classification Search
None
See application file for complete search history.

(56) References Cited

U.S. PATENT DOCUMENTS

| | | | | |
|---|---|---|---|---|
| 5,406,332 A * | 4/1995 | Shinohara | ......... | H01L 27/14681 250/208.1 |
| 8,896,029 B2 * | 11/2014 | Koizumi | ........... | H01L 27/14603 257/202 |
| 8,981,276 B2 * | 3/2015 | Yamakawa | ........ | H01L 27/14609 250/208.1 |
| 2006/0221667 A1 * | 10/2006 | Ogura | ............... | H01L 27/14625 365/149 |
| 2008/0237446 A1 * | 10/2008 | Oshikubo | ......... | H01L 27/14603 250/208.1 |
| 2012/0267695 A1 | 10/2012 | Yamashita | | |
| 2013/0141619 A1 * | 6/2013 | Lim | .................. | H01L 27/14609 348/302 |

FOREIGN PATENT DOCUMENTS

| | | |
|---|---|---|
| JP | 2007-324984 | 12/2007 |
| JP | 2008-205639 | 9/2008 |
| JP | 2012-147169 | 8/2012 |
| JP | 2012-227889 | 11/2012 |

OTHER PUBLICATIONS

Office Action issued Jan. 21, 2015 in Korean Patent Application No. 10-2014-0024575 (with English language translation).

* cited by examiner

*Primary Examiner* — Albert Cutler
(74) *Attorney, Agent, or Firm* — Oblon, McClelland, Maier & Neustadt, L.L.P

(57) ABSTRACT

According to one embodiment, a solid-state imaging device includes unit cells including a photoelectric conversion element, a signal detector and the amplifier transistor, respectively; a vertical signal line supplied with a reset signal and a pixel signal of the cell; a first interconnect connected to the signal detectors via a capacitance element; a second interconnect connected between the signal detectors and the amplifier transistors; and a switch element between the vertical signal line and the first interconnects. Unit cells arranged in a column direction is connected to a common vertical line and a common first interconnect.

11 Claims, 12 Drawing Sheets

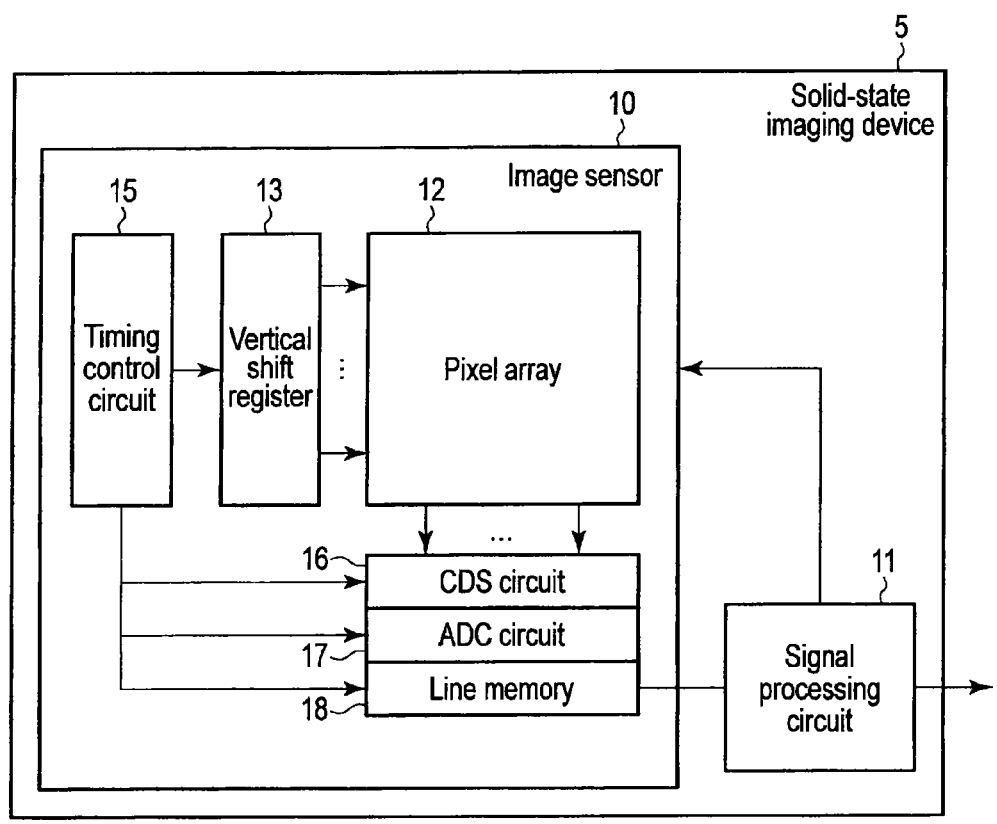
F I G. 1

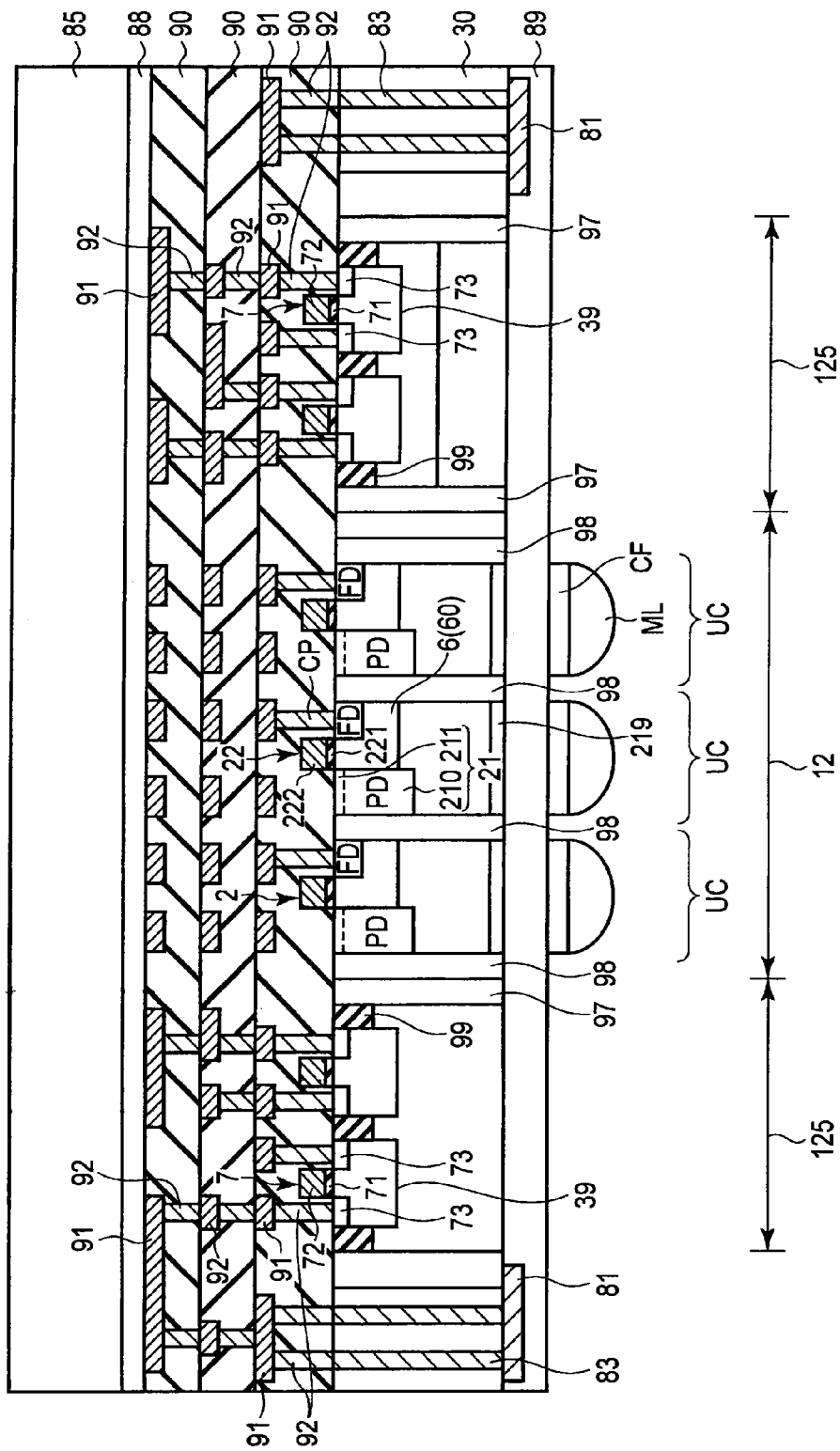
F I G. 2

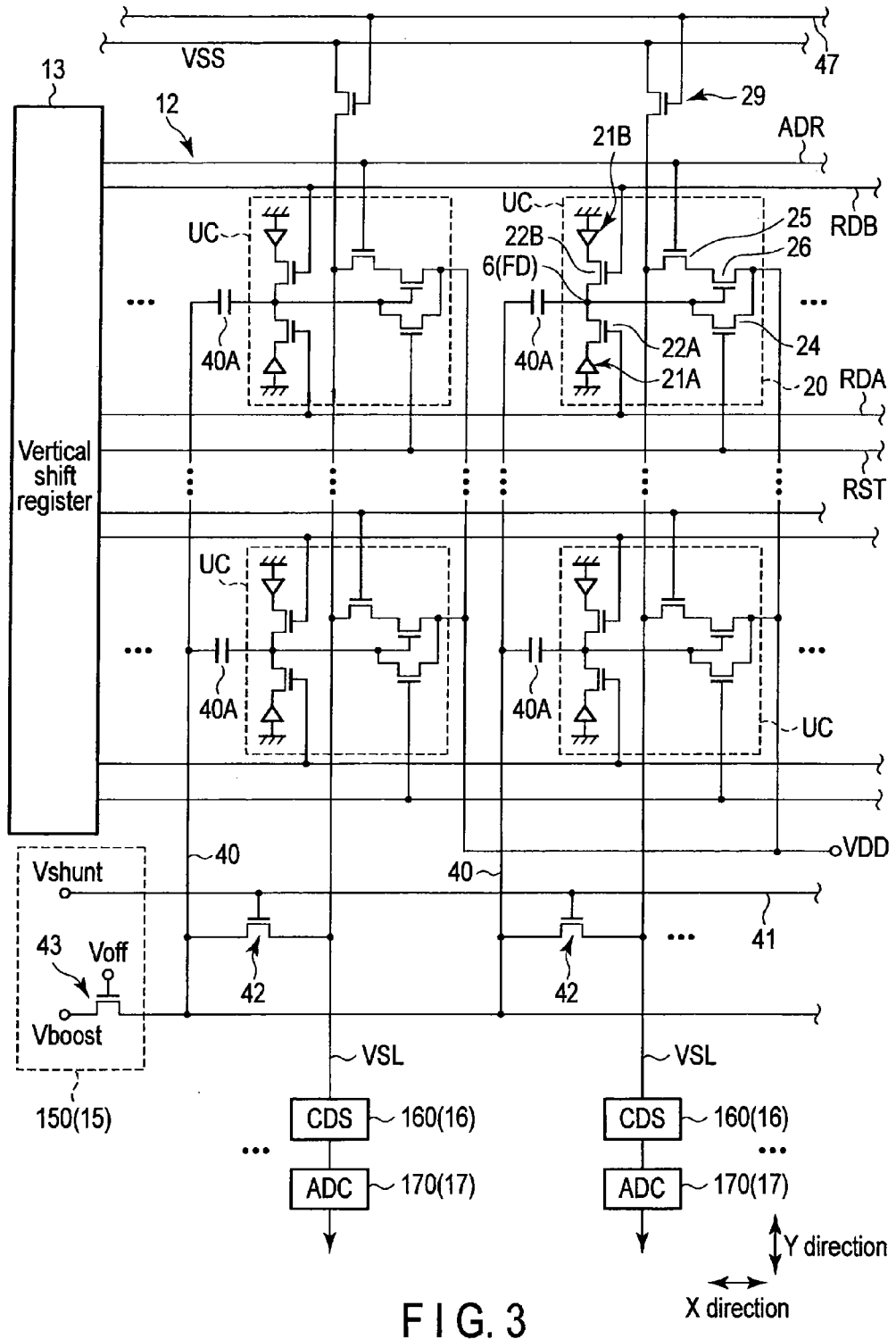
F I G. 3

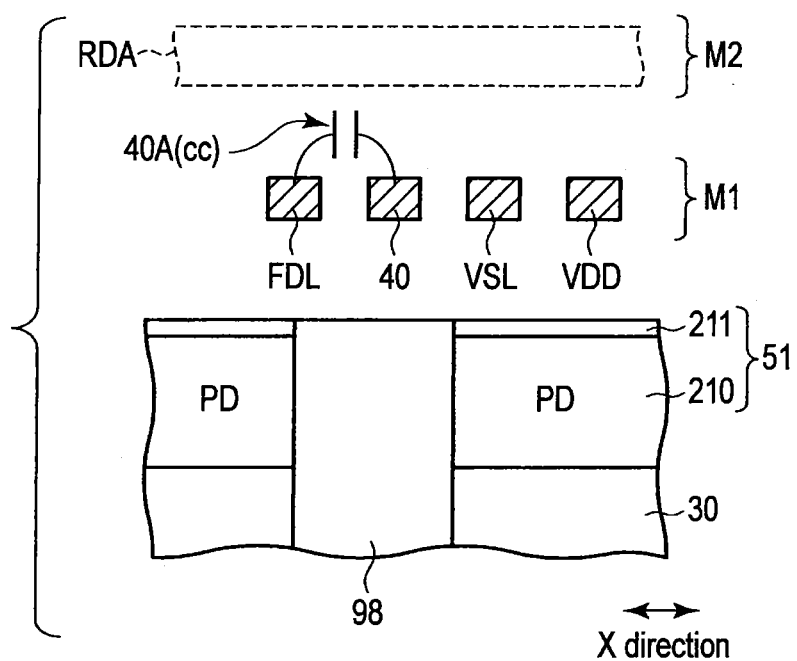
F I G. 5

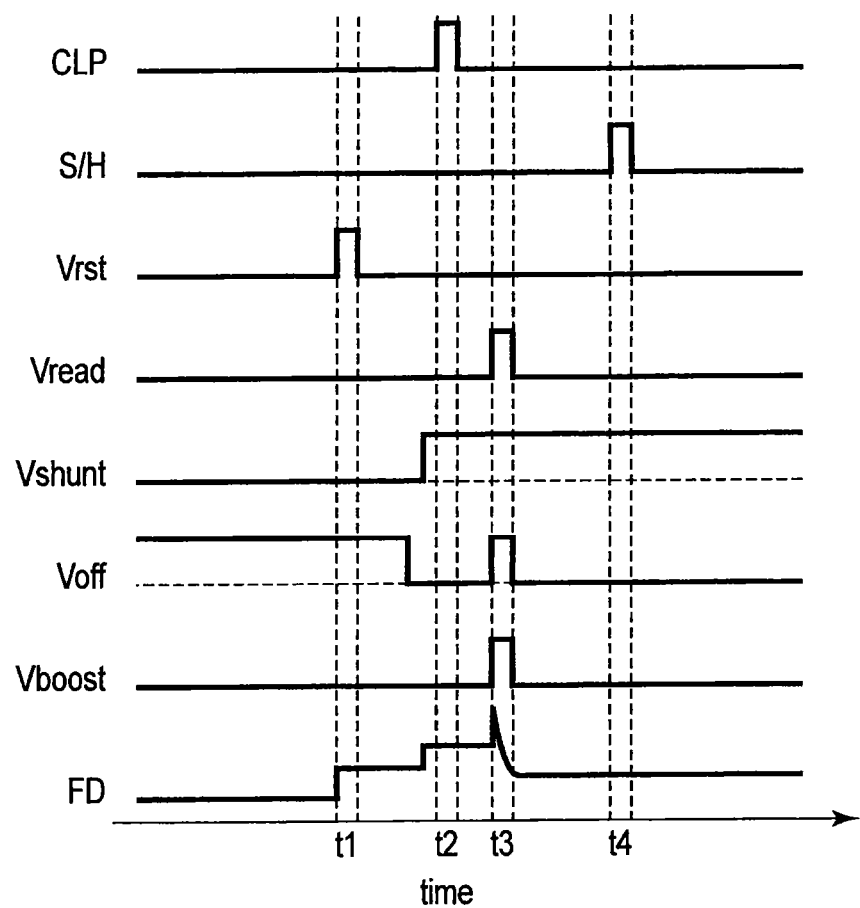
F I G. 7

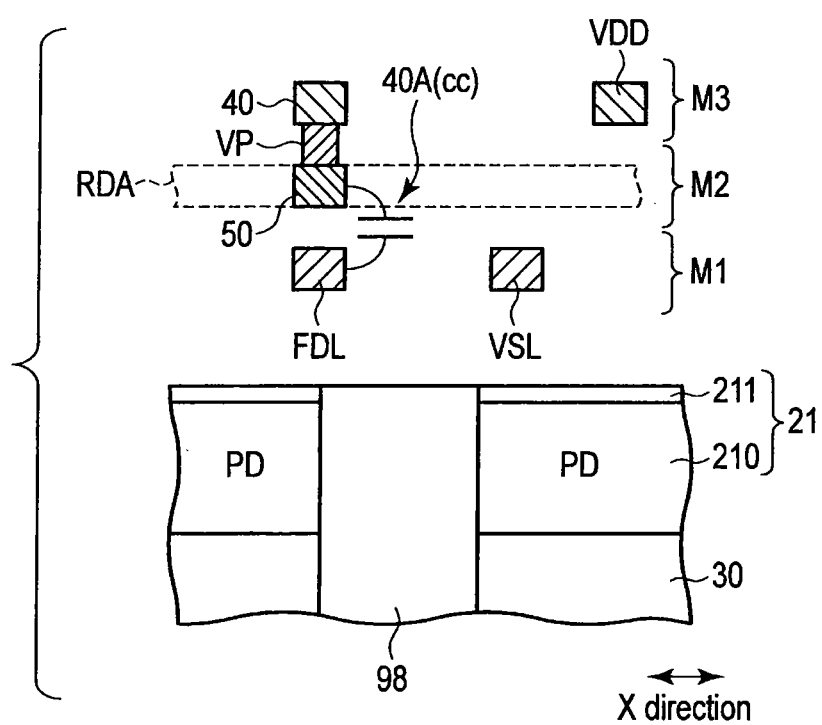
F I G. 9

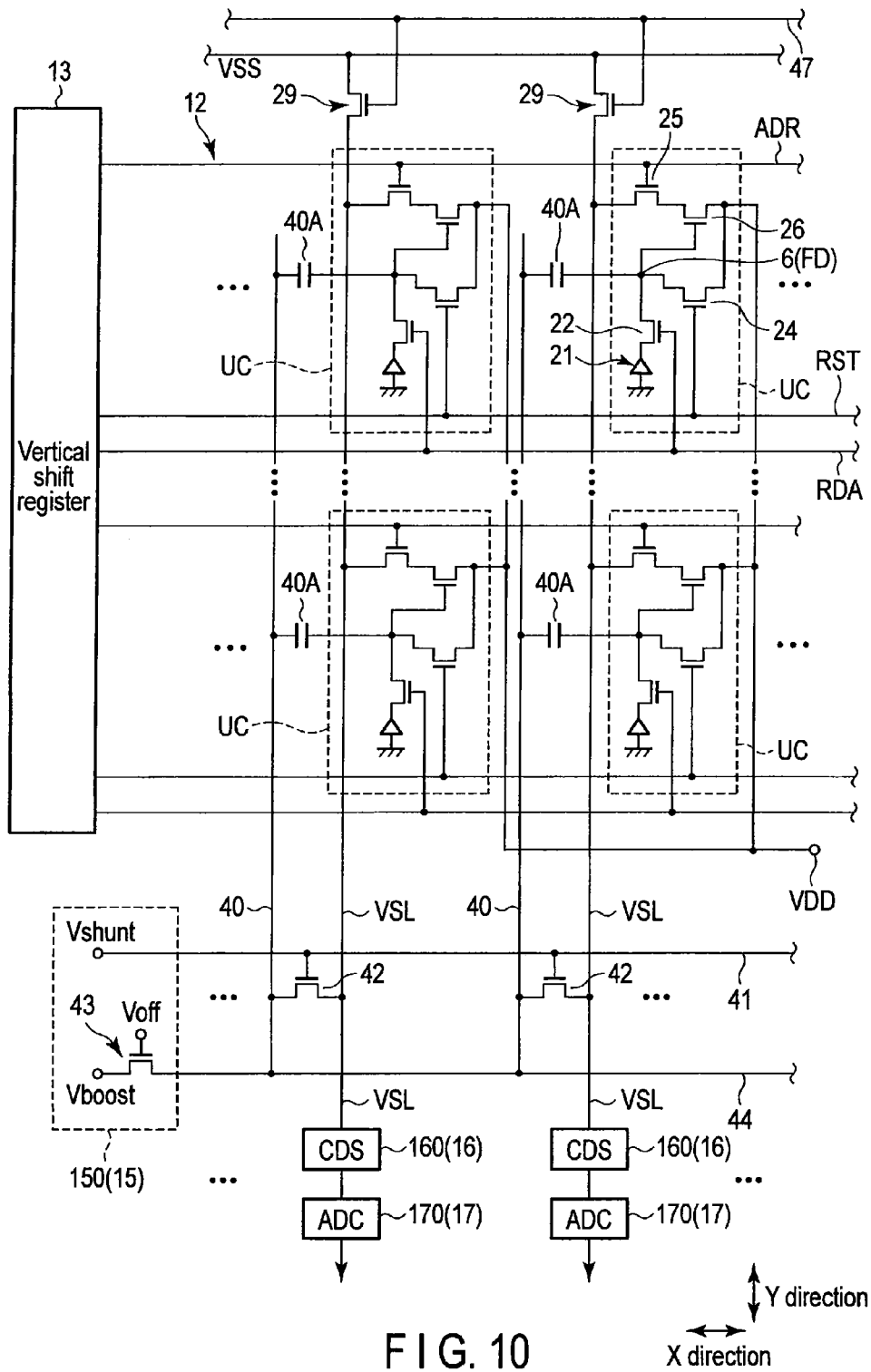
F I G. 10

SOLID-STATE IMAGING DEVICE WITH SWITCH ELEMENTS PROVIDED BETWEEN VERTICAL SIGNAL LINES AND INTERCONNECTS

CROSS REFERENCE TO RELATED APPLICATIONS

This application is based upon and claims the benefit of priority from Japanese Patent Application No. 2013-191137, filed Sep. 13, 2013, the entire contents of which are incorporated herein by reference.

FIELD

Embodiments described herein relate generally to a solid-state imaging device.

BACKGROUND

At present, a solid-state imaging device as is represented by a CMOS image sensor is used for various applications such as a digital still camera, video movie camera or monitoring camera. It is required for a device using the above image sensor to be able to photograph a dark subject with a high S/N ratio when the subject is photographed and stably attain a high output resolution of an image when a sufficiently bright subject is photographed. Further, in recent years, since a reduction in the size of the camera and high resolution thereof are required, the pixel size of the image sensor tends to be reduced.

BRIEF DESCRIPTION OF THE DRAWINGS

FIG. 1 is a diagram showing one example of the whole configuration of a solid-state imaging device.

FIG. 2 is a cross-sectional view schematically showing one example of the whole configuration of the solid-state imaging device.

FIG. 3 is an equivalent circuit diagram schematically showing the internal configuration of a solid-state imaging device according to a first embodiment.

FIG. 5 is a cross-sectional view schematically showing a structure example of the solid-state imaging device of the first embodiment.

FIG. 7 is a timing chart showing an operation example of a solid-state imaging device according to a second embodiment.

FIG. 9 is a cross-sectional view schematically showing the structure example of the solid-state imaging device of the third embodiment.

FIG. 10 and FIG. 11 are diagrams for illustrating modifications of the solid-state imaging device of the above embodiment.

DETAILED DESCRIPTION

Figure 4:
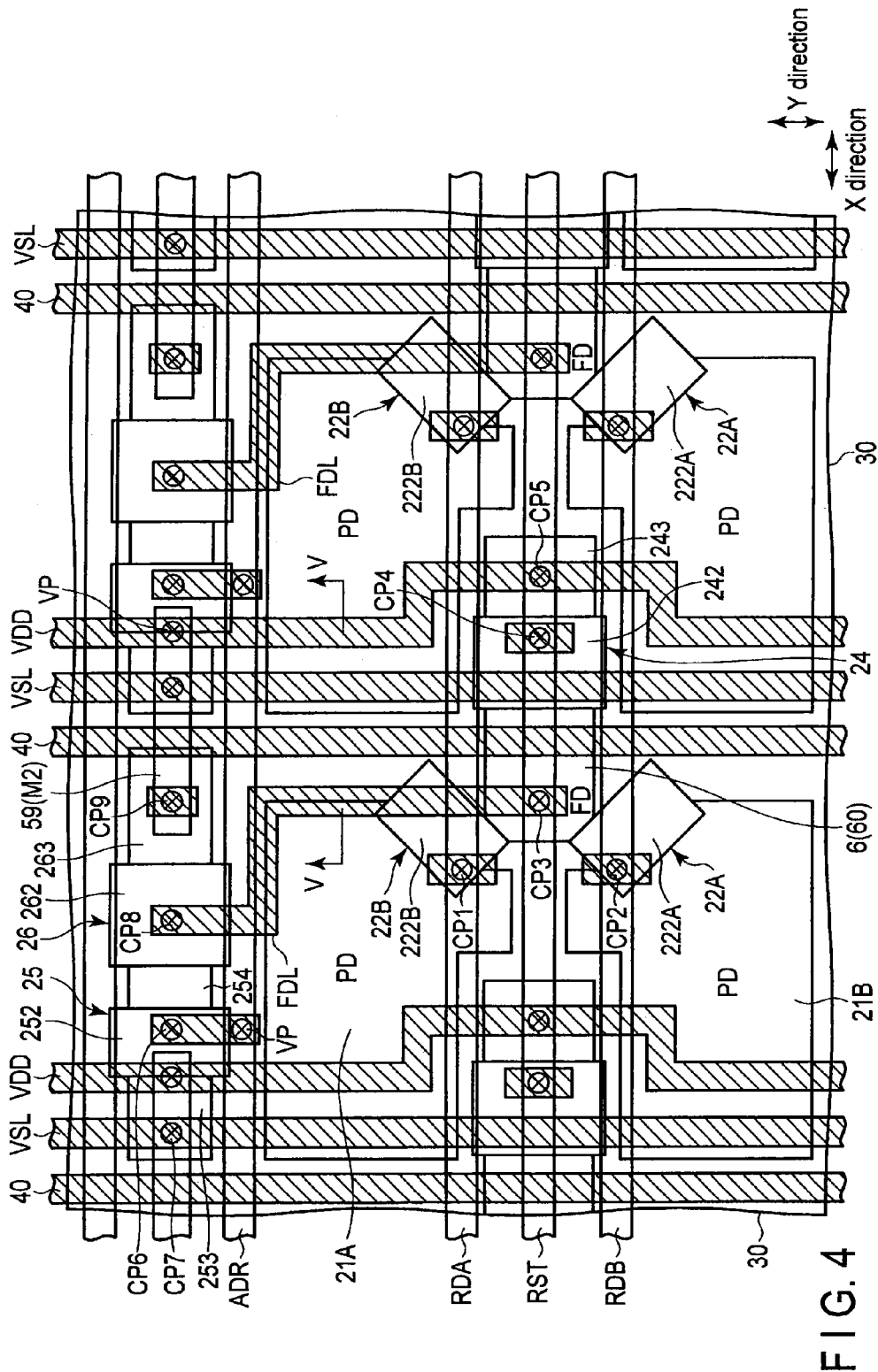
FIG. 4 is a plan view schematically showing a structure example of the solid-state imaging device of the first embodiment.

Embodiments are explained in detail with reference to the accompanying drawings. In the following explanation, constituents having the same functions and configurations are denoted by the same symbols and repetitive explanations are made only when required.

In general, according to one embodiment, a solid-state imaging device includes unit cells arranged in a matrix form in a pixel array, each of the unit cell including a photoelectric conversion element that generates signal charges based on incident light, a signal detector that detects a signal of the photoelectric conversion element and amplifier transistor connected to the signal detector; vertical signal lines, each of the vertical signal lines supplied with a reset signal of each of the unit cells in a reset state of the signal detector and a pixel signal of each of the unit cell in a signal charge holding state of the signal detector via each of the amplifier transistor; first interconnects, each of the first interconnects connected to each of the signal detectors via each of capacitance elements; second interconnects, each of the second interconnects connected between each of the signal detectors and each of the amplifier transistors; and switch elements, each of the switch elements provided between each of the vertical signal lines and each of the first interconnects. Unit cells arranged in a column direction among the unit cells arranged in the matrix form is connected to a common vertical line among the vertical signal lines and a common first interconnect among the first interconnects.

[Embodiment]

(1) First Embodiment

A solid-state imaging device according to a first embodiment is explained with reference to FIG. 1 to FIG. 6.

(a) Configuration

The configuration of the solid-state imaging device according to the first embodiment is explained with reference to FIG. 1 to FIG. 5.

FIG. 1 is a block diagram schematically showing the whole configuration of the solid-state imaging device of the first embodiment.

As shown in FIG. 1, the solid-state imaging device of the present embodiment includes an image sensor 10 used as a photographing device and a signal processing circuit 11. For example, the image sensor 10 is a CMOS image sensor.

The image sensor 10 includes a pixel array 12, vertical shift register 13, timing control circuit 15, correlation double-sampling circuit (CDS circuit) 16, analog-digital conversion circuit (ADC circuit) 17 and line memory 18. For signal processing, the CDS circuit 16 and ADC circuit 17 clamp and hold signals from pixels according to a control signal from the timing control circuit 15.

The pixel array 12 is provided in the photographing area of the image sensor 10. The pixel array 12 has a plurality of pixels arranged along the horizontal direction (row direction, X direction) and vertical direction (column direction, Y direction) of the pixel array 12 in an array form.

The vertical shift register 13 sequentially scans the rows of the pixel array 12 to control the read operation of respective pixels in the pixel array 12.

Each pixel includes a photodiode acting as a photoelectric conversion element. The photodiode generates signal charges corresponding to an amount of light incident on each pixel. Unit cells each including a pixel, a signal detector for a signal from the pixel and an element for controlling the operation of the pixel are provided in the pixel array 12.

The generated signal charge is subjected to a noise reduction process and AD conversion process by use of the CDS circuit 16 and ADC circuit 17 and converted to digital data (digital signal).

The line memory 18 holds a signal (digital data) of pixels of one line of the pixel array.

The timing control circuit 15 controls operation timings of the respective circuits 13, 16, 17, 18 in the image sensor 10.

Digital data is output to the signal processing circuit 11.

For example, the signal processing circuit 11 subjects digital data from the image sensor 10 to the lens shading correction process, damage correction process and noise reduction process.

The thus signal-processed data is output to the exterior of the solid-state imaging device and, at the same time, feedback-controlled in the image sensor 10, for example.

The configuration of the image sensor of the present embodiment is explained with reference to FIG. 2 to FIG. 5.

FIG. 2 is a cross-sectional view schematically showing the whole configuration of the image sensor of the present embodiment.

A semiconductor substrate 30 has a first surface and a second surface that faces the first surface in a direction perpendicular to the first surface. In the following description, the first surface of the semiconductor substrate 30 is called a front surface of the semiconductor substrate 30 and the second surface of the semiconductor substrate 30 is called a back surface of the semiconductor substrate 30. If the front and back surfaces of the semiconductor substrate 30 are not distinguished from each other, the front surface/back surface of the semiconductor substrate 30 is called a main surface of the semiconductor substrate 30.

For example, the image sensor 10 of this embodiment is a back-side illumination type image sensor in which the back surface side (second surface side) of the semiconductor substrate 30 is used as a light reception surface for light from the subject.

As shown in FIG. 2, in the image sensor 10 of this embodiment, the pixel array 12 in the image sensor 10 and a region (that is hereinafter referred to as a peripheral circuit region) 125 in which the analog circuit or logic circuit of the image sensor 10 is formed are provided in one semiconductor substrate (chip) 30. The signal processing circuit 11 of FIG. 1 may be formed in the peripheral circuit region 125 or provided in a chip (package) different from the chip (package) of the image sensor.

An element isolation region is provided between the pixel array 12 and the peripheral circuit region 125. Unit cells UC arranged adjacent to each other and the pixels contained therein are separated by the element isolation region. The formation region of each unit cell UC and pixel is surrounded by the element isolation region. The respective regions of the semiconductor substrate 30 are electrically isolated in the semiconductor substrate 30 by the element isolation region.

In FIG. 2, for simplification of the drawing, only photodiodes 21, read transistors 22 and floating diffusions 6 among the constituents of each unit cell UC are shown.

As shown in FIG. 2, the photodiode 21 is formed in the semiconductor substrate (or a semiconductor layer) 30 in the formation region (that is hereinafter referred to as unit cell formation region UC) of each unit cell UC in the pixel array 12.

The photodiode 21 is formed of at least one impurity layer (impurity semiconductor region) 210 formed in an N-type (or P-type) semiconductor substrate 30. The photodiode 21 subjects light incident on the photodiode 21 to photoelectric conversion. Charges corresponding to an amount of incident light photoelectrically converted by the photodiode 21 are generated in the impurity layer 210 of the photodiode 21 and stored in the impurity layer 210.

The photodiode 21 may be formed of a plurality of impurity layers having different conductivity types and impurity concentrations to enhance the characteristic (for example, the sensitivity) of the photodiode 21.

A front surface shield layer 211 is formed in the photodiode 21 on the front surface side of the semiconductor substrate 30 and a back surface shield layer 219 is formed in the semiconductor substrate 30 of the unit cell formation region on the back surface side of the semiconductor substrate 30. The front and back surface shield layers 211 and 219 reduce diffusion of impurities with respect to the photodiode 21 and suppress the characteristic deterioration of the photodiode 21, for example, an increase in the dark current.

The photodiode 21 is connected to the floating diffusion 6 used as a signal detector 6 via the read transistor 22. The floating diffusion 6 is a diffusion layer (impurity semiconductor region) 60 formed in the semiconductor substrate 30.

The diffusion layer 60 used as the floating diffusion is connected to an amplifier transistor 26 via contact plug CP and interconnect (signal detection line).

A gate electrode 222 of the read transistor 22 is formed above a semiconductor region between the photodiode 21 and the floating diffusion 6 with a gate insulating film 221 disposed therebetween. For example, impurity layers (not shown) formed in the semiconductor substrate 30 are used as the source and drain of the read transistor 22. Further, impurity layers contained in the photodiode 21 or impurity layers acting as the floating diffusion 6 may be used as the source and drain of the read transistor 22.

Element isolation layers 98 formed in the element isolation region are provided in the semiconductor substrate 30 to surround adjacent unit cells UC and adjacent photodiodes 21. The element isolation layers 98 electrically isolate adjacent unit cells UC and adjacent photodiodes 21 from each other. For example, the element isolation layers 98 in the pixel array 12 are formed of impurity layers (that are hereinafter referred to as element isolation impurity layers). The element isolation layers 98 in the pixel array 12 may be formed of insulating films (element isolation insulating films) with the STI structure.

In the peripheral circuit region 125, for example, the vertical shift register 13, CDS circuit 16, ADC circuit 17 and the like are provided.

P-type or N-type well regions 39 are provided in the peripheral circuit region 125. In the well region 39, constituent elements of the peripheral circuit of the image sensor 10 such as resistance elements, capacitance elements and field-effect transistors are formed. For simplifying the drawing, only field-effect transistors 7 used as the constituent elements of the peripheral circuit are shown in FIG. 2.

In the peripheral circuit region 125, the field-effect transistor (for example, MOS transistor) 7 is formed in the well region 39. In each well region 39, two impurity layers (diffusion layers) 73 used as the source and drain of the transistor 7 are formed. A gate electrode 72 is formed on a gate insulating film 71 provided on the well region 39 between the two diffusion layers 73. Whether the field-effect transistor 7 is of a P-channel type or N-channel type or an enhancement type or depletion type is determined according to the conductivity type of the well region 39 on which the field-effect transistor 7 is formed or the conductivity type of the impurity regions (diffusion layers) used as the source and drain.

The gate electrodes 222, 72 of the transistors 22, 7 and the upper surfaces (front-surface shield layer 211) of the photodiodes 21 are covered with an interlayer insulating film 90 with the multilayer interconnect structure formed on the front-surface side of the semiconductor substrate 30.

For example, the gate electrodes 222, 72 of the transistors 22, 7, the source/drain regions 73 of the transistors 22, 7 and the terminals of the elements formed on the semiconductor substrate 30 are connected to conductive layers (interconnects) 91 provided at the first (lowermost) interconnect level counted from the semiconductor substrate 30 side via respective contact plugs 92. Since the conductive layer 91 in each interlayer insulating film 90 is connected to a conductive layer 91 provided at the upper-layered (or lower-layered) interconnect level via the plug 92, a plurality of elements formed on the semiconductor substrate 30 are connected to one another. As a result, a plurality of circuits contained in the image sensor 10 are formed.

Thus, with the multilayer interconnect technique, the laminated interlayer insulating films 90 include the interconnects 91 of the multilayer structure formed at the respective interconnect levels.

A support substrate 85 is formed above the top-layer interlayer insulating film 90. The support substrate 85 supports the back-side illumination type image sensor 10. For example, the support substrate 85 is stacked above the top-layer interlayer insulating film 90 via an adhesive layer (protection layer, flattening layer) 88. As the support substrate 85, a silicon substrate or insulating substrate is used, for example. A interconnect (not shown) formed by use of the re-distribution technique may be provided between the support substrate 85 and the interlayer insulating film 90.

For example, the conductive layer (interconnect) 91 in the top-layer interlayer insulating film 90 or a metal layer (not shown) on (or in) the support substrate 85 is used as a pad on the front-surface side of the image sensor 10.

Color film CF and microlens array ML are provided on the back-surface side of the semiconductor substrate 30 in the region that overlaps with the pixel array 12 in the direction perpendicular to the main surface of the semiconductor substrate 30. As a result, light of the preset wavelength region is applied to each photodiode (pixel). For example, color filter CF has an array pattern of coloring films such as a bayer pattern or RGBW pattern.

Through electrodes 83 are formed in the semiconductor substrate 30. The interconnects/plugs 91, 92 on the front-surface side of the semiconductor substrate 30 are connected to the interconnects/pads 81 on the back-surface side of the semiconductor substrate 30 via the through electrodes 83. The through electrodes 83 are formed by use of the TSV (Through Silicon Via) technique and are formed of polysilicon containing a high concentration of an impurity or metal, for example. The through electrodes 83 are buried in the semiconductor substrate 30 to fill through holes formed in the internal portion of the semiconductor substrate 30.

In the following description, a region other than an optical black region in the pixel array 12 is called an effective region.

FIG. 3 is an equivalent circuit diagram schematically showing the pixel array of the image sensor 10 of this embodiment and a neighboring circuit thereof.

As shown in FIG. 3, a plurality of pixels 21A, 21B are arranged in a matrix form in the pixel array 12 of the image sensor of this embodiment.

In this embodiment, the pixel array 12 of the image sensor 10 has the two-pixel/one-cell structure. In the two-pixel/one-cell structure, one unit cell UC has the circuit configuration including two pixels.

A plurality of unit cells UC are arranged in a matrix form in the pixel array 12. Respective unit cells UC are provided in intersecting positions between control lines RDA, RDB, RST, ADR in the pixel array 12 and signal lines VSL. Control lines RDA, RDB, RST, ADR are provided in the pixel array 12 to supply signals used for controlling the operation (on/off) of unit cell UC to unit cell UC. Signal lines (first interconnects) VSL are arranged in the pixel array 12 to supply signals photoelectrically converted by use of photodiodes (pixels) 21A, 21B to the exterior of unit cell UC.

In unit cell UC of the two-pixel/one-cell structure, one floating diffusion 6 used as the signal detector 6 of a pixel (unit cell) is commonly used for the two photodiodes 21A, 21B. For example, unit cell UC includes two read transistors 22A, 22B, reset transistor 24, address transistor 25 and amplifier transistor 26 in addition to the photodiodes 21A, 21B and floating diffusion 6. A pixel circuit is formed of the photodiodes 21A, 21B and a plurality of transistors 22A, 22B, 24, 25, 26.

In unit cell UC of the two-pixel/one-cell structure, the two read transistors 22A, 22B are provided in unit cell UC to respectively correspond to the photodiodes 21A, 21B. In unit cell UC of the two-pixel/one-cell structure, the reset transistor 24, address transistor 25 and amplifier transistor 26 are commonly used by the two photodiodes 21A, 21B.

The anodes of the photodiodes 21A, 21B are coupled to the fixed potential and, for example, grounded. The cathodes of the photodiodes 21A, 21B are connected to the floating diffusion 6 via the current paths of the read transistors 22A) 22B, respectively.

Each of the photodiodes 21A, 21B converts light that passes the microlens and color filter and is made incident on the photodiode into signal charges (electrical signal) and stores the charges. In the following description, the photodiodes 21A, 21B are expressed as photodiodes 21 when they are not distinguished from each other.

The read transistors 22A, 22B control storage and transfer of the signal charges of the photodiodes 21A, 21B. The gates of the read transistors 22A, 22B are respectively connected to read control lines RDA, RDB. One-side ends of the current paths of the read transistors 22A, 22B are respectively connected to the cathodes of the photodiodes 21A, 21B. The other ends of the current paths of the read transistors 22A, 22B are connected to the floating diffusion 6. In the following description, the read transistors 22A, 22B are expressed as read transistors 22 when they are not distinguished from each other.

The reset transistor 24 resets the potential of the floating diffusion 6 (the gate potential of the amplifier transistor 5). The gate of the reset transistor 24 is connected to reset control line RST. One end of the current path of the reset transistor 24 is connected to the floating diffusion 6. The other end of the current path of the reset transistor 24 is connected to power source line (power source terminal) VDD, for example.

The address transistor 25 functions as a selection element used for selecting (activating) unit cell UC. The gate of the address transistor 25 is connected to address control line ADR. One end of the current path of the address transistor 25 is connected to the other end of the current path of the amplifier transistor 26 and the other end of the current path of the address transistor 25 is connected to vertical signal line VSL.

The amplifier transistor 26 amplifies a signal from the photodiode 21 stored by the floating diffusion 6. The gate of the amplifier transistor 26 is connected to the floating diffusion 6. One end of the current path of the amplifier transistor 26 is connected to power source line VDD and the other end of current path of the amplifier transistor 26 is connected to one end of the current path of the address transistor 25. A signal amplified by the amplifier transistor 26 is output to vertical signal line VSL as a signal of unit cell (or a pixel) UC via the address transistor 25 set in the on state. The amplifier transistor 26 functions as a source follower.

A signal output from unit cell UC based on a detection signal of the floating diffusion 6 that stores the signal charges while the floating diffusion 6 holds the signal charge transferred from the photodiode via the read transistor 22 is called a pixel signal or pixel voltage. A signal output from unit cell UC based on a detection signal of the floating diffusion 6 set in the reset state when the floating diffusion 6 is set in the reset state by the reset transistor is called a reset signal (or reset voltage).

The vertical shift register 13 is connected to two read control lines RDA, RDB, address control line ADR and reset control line RST. The vertical shift register 13 controls the potentials (signal levels) of read control lines RDA, RDB, address control line ADR and reset control line RST to control and select a plurality of unit cells UC (and pixels) in the pixel array 12 in the row unit.

A processing unit (CDS unit) 160 of the CDS circuit 16 and a processing unit (ADC unit) 170 of the ADC circuit are each connected to vertical signal line VSL.

A signal held in each of the processing units 160, 170 is transferred to the line memory 18 and signal processing circuit 11 via a horizontal signal line (not shown) by causing a horizontal shift register (not shown) to sequentially scan vertical signal lines VSL.

A load transistor 29 is used as a current source for vertical signal line VSL. One end of the current path of the load transistor 29 is connected to one end of the current path of the address transistor 25 via vertical signal line VSL. The other end of the current path of the load transistor 29 is connected to ground line Vss. The gate end of the load transistor 29 is connected to a control line 47. The load transistor 29 functions as a constant current source.

In the image sensor with the above circuit configuration, a variation in the potential of the floating diffusion 6 appears substantially as it is as a variation in the potential of the vertical signal line by a source follower circuit formed to be connected to vertical signal line VSL.

In the image sensor of the present embodiment, a capacitance element 40A is connected to each floating diffusion 6.

As shown in FIG. 3, one capacitance element 40A is provided for each unit cell UC. One end of each capacitance element 40A is connected to the floating diffusion 6 and the other end of each capacitance element 40A is connected to a corresponding one of interconnects (that are hereinafter referred to as capacitance interconnects) 40. For example, the capacitance interconnect 40 extends in a direction parallel to vertical signal line VSL. The capacitance interconnect 40 is provided in the interlayer insulating film 90.

On the end side of each capacitance interconnect 40 (in the end portion of the pixel array 12), a field-effect transistor (for example, an n-type MOS transistor) 42 used as a switching element is connected between the capacitance interconnect 40 and vertical signal line VSL. The current path of the field-effect transistor 42 is connected between the capacitance interconnect 40 and vertical signal line VSL. The gate of the field-effect transistor 42 is connected to a control line (shunt line) 41 to which control signal Vshunt is supplied. When the field-effect transistor 42 is turned on, the capacitance interconnect 40 is connected to vertical signal line VSL.

In the following description, control signal Vshunt for setting a conductive state between the capacitance interconnect 40 and vertical signal line VSL is called shunt control signal Vshunt.

Further, a voltage terminal from which voltage Vboost is output is connected to the respective capacitance interconnects 40 via a field-effect transistor (for example, a p-type MOS transistor) 43 used as a switching element. Voltage Vboost from the voltage terminal is applied to the respective capacitance interconnects 40 via the field-effect transistor 43 set in the on state to control the potentials of the capacitance interconnects 40. For example, if voltage Vboost is supplied to the capacitance interconnects 40, the potentials of the capacitance interconnects 40 are boosted. In the following description, voltage Vboost used for boosting the potential of the capacitance interconnect 40 is called boost voltage Vboost.

For example, a control circuit 150 of the timing control circuit 15 controls the signal level of shunt control signal Vshunt, the potential of boost voltage Vboost and the operation of the transistor 43 (the operation of outputting the boost voltage).

The capacitance element 40A is connected to the floating diffusion 6 to enhance the dynamic range of the image sensor.

The structures of the capacitance element and capacitance interconnect connected to the floating diffusion in the image sensor of this embodiment are explained with reference to FIG. 4 and FIG. 5.

FIG. 4 and FIG. 5 are views for illustrating the structure of the internal portion of the pixel array 12 of the image sensor 10 of this embodiment. FIG. 4 is a plan view schematically showing the plane structure of the pixel array 12 of the image sensor 10 of this embodiment. FIG. 5 is a cross-sectional view schematically showing the cross-sectional structure of the pixel array 12 of the image sensor 10 of this embodiment.

In FIG. 4, a part of the pixel array 12 of the image sensor 10 of this embodiment is extracted and shown. FIG. 5 shows the cross section taken along the V-V line of FIG. 4. In FIG. 5, the interlayer insulating film is not shown for simplifying the drawing.

As shown in FIG. 4 and FIG. 5, vertical signal line VSL of the image sensor 10 is provided in the pixel array 12 to extend in the Y direction (column direction). Read control lines RDA, RDB, reset control line RST and address control line ADR are provided in the pixel array 12 to extend in the X direction (row direction).

In the layout of the pixel array 12 of the image sensor with the two-pixel/one-cell structure shown in FIG. 4, formation regions (that are hereinafter referred to as photodiode formation regions) of the two photodiodes (PD) 21A, 22A in each unit cell UC are arranged in the Y direction.

The read transistor 22 is provided in the corner portion of the photodiode formation region of the photodiode 21 corresponding to each read transistor 22. In unit cell UC with the two-pixel/one-cell structure, the two read transistors 22A, 22B in unit cell UC are provided adjacent to each other in the column direction in the unit cell formation region.

The gate electrodes 222A, 222B of the read transistors 22A, 22B are provided above the semiconductor substrate 30 via a gate insulating film (not shown) with the gate electrodes 222A, 222B of the read transistors 22A, 22B having an angle inclined with respect to the X direction and Y direction in the horizontal direction of the surface of the semiconductor substrate 30. The gate electrodes 222A, 222B of the read transistors 22A, 22B are respectively connected to read control lines RDA, RDB via contact plugs CP1, CP2.

The floating diffusion (FD) layer 6 used as the signal detector 40 is provided in the semiconductor substrate 30 to connect the formation region (that is hereinafter referred to as a floating diffusion formation region) of the floating diffusion 6 to the channel region of the read transistor 22.

The floating diffusion formation region is connected to a photodiode formation region via the channel region of the read transistor 22. The floating diffusion formation region and the photodiode formation region are a continuous semiconductor region.

The diffusion layer 60 used as the floating diffusion 6 is provided in the floating diffusion formation region. The diffusion layer 60 used as the floating diffusion (FD) is connected to signal detection line FDL via contact plug CP3.

The channel region of the reset transistor 24 is connected to the floating diffusion 6. That is, the channel region of the reset transistor 24 and the floating diffusion formation region are a continuous semiconductor region.

The gate electrode 242 of the reset transistor 24 is connected to reset control line RST via contact plug CP4. The source/drain diffusion layer 243 of the reset transistor 24 that lies on the opposite side of the floating diffusion is connected to power source line VDD via contact plug CP5.

The formation region of the address transistor 25 and the formation region of the amplifier transistor 26 are arranged adjacent to the photodiode formation region in the Y direction. The formation regions of the address transistor 25 and amplifier transistor 26 are isolated from the photodiode formation region and floating diffusion formation region by an element isolation region (for example, element isolation impurity layer).

The gate electrode 252 of the address transistor 25 and the gate electrode 262 of the amplifier transistor 26 are provided on the common semiconductor substrate 30 via a gate insulating film (not shown). The gate electrode 252 of the address transistor 25 is connected to address control line ADR via plugs CP6, VP and lead-out interconnect. One of the source/drain diffusion layers 253 of the address transistor 25 is connected to vertical signal line VSL.

The gate electrode 262 of the amplifier transistor 26 is connected to signal detection line FDL via contact plug CP8. The gate electrode 262 of the amplifier transistor 26 is connected to the floating diffusion 6 via signal detection line FDL.

One of the source/drain diffusion layers of the amplifier transistor 26 and the other source/drain diffusion layer 254 of the address transistor 25 are commonly used. The other source/drain diffusion layer 263 of the amplifier transistor 26 is connected to power source line VDD via contact plugs CP9, VP and an intermediate interconnect 59 at the second interconnect level.

As shown in FIG. 5, vertical signal line VSL and power source line VDD are provided at first interconnect level M1. Read control lines RDA, RDB, reset control line RST and address control line ADR are provided at second interconnect level M2. First interconnect level M1 is set on the side of the semiconductor substrate 30 with respect to second interconnect level M2.

As shown in FIG. 4 and FIG. 5, the capacitance interconnect 40 is provided at first interconnect level M1. For example, the capacitance interconnect 40 extends in parallel with vertical signal line VSL in the Y direction. The capacitance interconnect 40 is laid out between signal detection line FDL and vertical signal line VSL in a direction parallel to the front surface of the semiconductor substrate 30. Vertical signal line VSL adjacent to the capacitance interconnect 40 is a vertical signal line connected to a different unit cell adjacent to a unit cell connected to the capacitance interconnect 40 in the row direction.

The capacitance interconnect (that is also called a boosting interconnect) 40 is provided adjacent to signal detection line FDL connected to the floating diffusion 6 in a direction parallel to the main surface of the semiconductor substrate 30. Capacitive coupling 40A occurs between the capacitance interconnect 40 and signal detection line FDL that are adjacently disposed on both sides of an insulating body (interlayer insulating film). The capacitive coupling 40A functions as a capacitance element 40A connected to the floating diffusion 6. The magnitude of electric capacitance CC of the capacitance element 40A caused by the capacitive coupling is adjusted by adjusting at least one of the distance between the capacitance interconnect 40 and signal detection line FDL and the facing area of the capacitance interconnect 40 and signal detection line FDL (the length of portions of the two interconnects 40 and FDL that are adjacent to each other).

Signal detection lines FDL are electrically isolated for each unit cell UC. Therefore, even if the capacitance interconnect 40 is commonly used by a plurality of unit cells (pixels), the capacitance element 40A is connected for each floating diffusion 6 of unit cell UC.

As described above, the capacitance interconnect 40 is connected to the voltage terminal of boost voltage Vboost via the transistor 43. The capacitance interconnect 40 is connected to vertical signal line VSL via a channel region of the transistor 42. The transistors 42, 43 are provided in the end portion of the pixel array 12 or in the peripheral circuit region 125.

In this embodiment, the capacitance element 40A connected to the floating diffusion 6 is formed by use of the capacitive coupling between the interconnects 40 and FDL. Therefore, an increase in the formation region of the elements on the semiconductor substrate 30 can be suppressed in comparison with a case wherein the capacitance element 40A connected to the floating diffusion 6 is formed of an element such as a MOS capacitor provided on the semiconductor region. However, it is also possible to form a capacitance element such as a MOS capacitor on the semiconductor region 30 in the pixel array 12 or peripheral circuit region 125 and connect the element to the floating diffusion 6 due to the uniformity of the characteristic of the capacitance element 40A.

As described above, a variation in the potential of the floating diffusion appears as a variation in the potential of the vertical signal line by use of a source-follower circuit configured by a pixel circuit (unit cells).

It is preferable for the image sensor to have a good S/N ratio when a dark subject is photographed and a characteristic that an image can be photographed in a wide dynamic range to stably acquire sufficiently high output resolution when a sufficiently bright subject is photographed. The image sensor can acquire the same image as an image viewed with a person's eyes by providing the image sensor with a wide dynamic range.

In recent years, since it is required to reduce the size of a photographing optical device to reduce the camera size and it is also strongly required to attain high resolution, the pixel size of the image sensor tends to be reduced. In this case, it becomes difficult to acquire an image having a wide dynamic range.

If the pixel size is reduced, the sensitivity is lowered since an amount of light that can be received by the photodiode is reduced. In this case, noise occurring in the pixel circuit or the succeeding-stage circuit is reduced as much as possible to maintain a desired S/N ratio.

For example, the capacitance of the floating diffusion is set to a value as small as possible and the output voltage of the floating diffusion for each signal electron is set higher. As a result, the signal voltage becomes higher with respect to the noise occurring in the succeeding-stage output circuit including the amplifier transistor to enhance the S/N ratio.

Thus, it becomes possible to improve the S/N ratio at the photographing time of a dark subject in a low-illumination environment in which the number of signal charges is less by reducing the capacitance of the floating diffusion.

However, since an amount of incident light on the photodiode is large when a bright subject is photographed in a high-illumination environment, the number of signal charges occurring in the photodiode becomes larger and the number of signal charges that must be stored in the floating diffusion becomes large.

When the capacitance of the floating diffusion is small, a variation in the potential of each electron becomes large. Therefore, when a large number of signal charges are transferred from the photodiode to the floating diffusion, the potential of the floating diffusion to which the signal charges are transferred may sometimes become lower than the potential of the photodiode in the depleted state after the signal charges (electrons) are read. As a result, there occurs a possibility that all of the electrons stored in the photodiode are not transferred from the photodiode to the floating diffusion.

In this case, a problem that the linearity of an output signal in an image to be displayed is lost will occur and the quality of the image may be lowered.

As one example of the technique for suppressing the above problem, the operation of increasing a current (source-follower through current) flowing in the vertical signal line while the reset transistor is set on and decreasing a current flowing in the vertical signal line while the black level at the CDS operation time is clamped is performed. By this operation, the potential of the vertical signal line is changed to the positive side while the reset transistor is set on and the potential of the floating diffusion is raised due to the capacitive coupling between the vertical signal line and the floating diffusion. However, in this operation, since the current flowing in the vertical signal line temporarily becomes larger, there occurs a possibility that the power consumption of the image sensor or the like becomes larger.

In the image sensor of the present embodiment, the potential of the floating diffusion 6 is boosted as will be described below.

That is, when the potential of the floating diffusion 6 is reset by turning on the reset transistor 24, vertical signal line VSL and the capacitance interconnect (boosting interconnect) 40 are isolated to fix vertical signal line VSL at a relatively low potential.

After this, vertical signal line VSL and the capacitance interconnect 40 are connected at the timing before the reset signal is clamped by the succeeding-stage circuits 160, 170. As a result, the potential of vertical signal line VSL is changed from the relatively low fixed potential to relatively high potential corresponding to the potential of the floating diffusion. At this time, the potential of the floating diffusion 6 is boosted to a relatively high voltage according to a variation in the potential of vertical signal line VSL by the capacitance element 40A provided between the capacitance interconnect 40 and the floating diffusion 6.

Thus, in this embodiment, the potential of the floating diffusion when the reset signal of the floating diffusion 6 is clamped and before the signal charges are transferred from the photodiode 21 to the floating diffusion 6 can be set higher in comparison with that of a general image sensor.

Therefore, even when a large number of signal charges are transferred from the photodiode 21 to the floating diffusion 6, for example, when a bright subject (highly luminescent subject) is photographed, an excessive lowering in the potential of the floating diffusion 6 caused by the transferred signal charges can be suppressed and almost no signal charges will remain in the photodiode 21 and the reverse passage of signal charges from the floating diffusion 6 to the photodiode 21 will almost not occur.

Thus, according to the image sensor of this embodiment, the linearity of an output signal can be maintained in a wide range and an image with a wide dynamic range can be formed.

Therefore, the image sensor of this embodiment can improve the dynamic range of the floating diffusion and the dynamic range of an output of the source follower (amplifier transistor) without increasing the power consumption of the image sensor caused by an increase in the current flowing in the vertical signal line.

In the image sensor of this embodiment, the capacitance interconnect 40 and vertical signal line VSL are short-circuited when a reset signal acting as a reference signal from the unit cell (pixel) is clamped and when the potential (pixel signal) of the floating diffusion 6 caused by signal charges from the photodiode 21 that are generated based on light from a subject is detected. Therefore, the effective capacitance of the floating diffusion 6 having the capacitance of the capacitance element 4A added thereto is reduced and the capacitance of the capacitance element 4A is released from the floating diffusion 6 (the capacitance of the floating diffusion 6) when the pixel signal of the photodiode is output. As a result, a lowering in the conversion gain caused by the capacitance element 40A used for improving the dynamic range is prevented.

The configuration of the image sensor of this embodiment is explained by taking the back-side illumination type image sensor as an example, but an image sensor with the circuit configuration having a capacitance element connected to the floating diffusion can be applied to a front-side illumination type image sensor and the above effect can be obtained.

As described above, according to the solid-state imaging device of the first embodiment, the quality of the image formed by use of the image sensor can be enhanced.

(b) Operation Example

The operation example of the solid-state imaging device (image sensor) of the first embodiment is explained with reference to FIG. 6. In this case, the operation example of the image sensor of this embodiment is explained by adequately using FIG. 1 to FIG. 5 in addition to FIG. 6.

Figure 6:
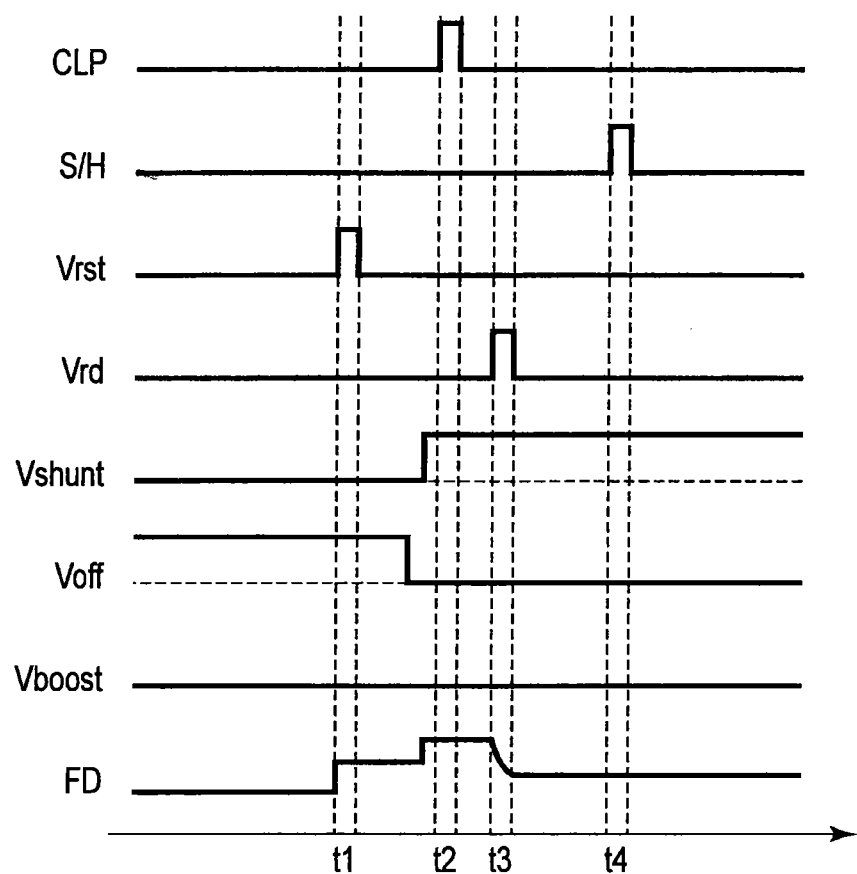
FIG. 6 is a timing chart showing an operation example of the solid-state imaging device of the first embodiment.

FIG. 6 is a timing chart for illustrating the operation example of the image sensor of the first embodiment. The abscissa of FIG. 6 indicates time and the ordinate of FIG. 6 indicates potentials (signal levels) of signals.

For example, the operation of reading a signal (charges) from unit cell UC of the pixel array 12 in the image sensor of this embodiment is performed as follows.

Light from a subject is made incident on the image sensor and the incident light is subjected to photoelectric conversion by the photodiode 21. Signal charges generated by photoelectric conversion of the photodiode 21 are stored in the photodiode 21 by setting the read transistor 22 in the off state.

The signal level of address control line ADR corresponding to the selected row of the pixel array 12 is set to an H level by the vertical shift register 13 based on the operation timing specified by the timing control circuit 15. As a result, the address transistor 25 is turned on. The current path of the amplifier transistor 26 is connected to vertical signal line VSL via the on-state address transistor 25.

Thus, a unit cell belonging to a certain row is selected and the potential of the reset-state floating diffusion 6 is detected. At this time, control signal Voff is set to the H (high) level by the control operation of the timing control circuit 15 to turn on the N-type MOS transistor 43 acting as a control element. Further, the signal level of control signal Vshunt supplied to the control line 41 is set to an L (low) level. The N-type MOS transistor 42 acting as a switching element is kept off. The capacitance interconnect 40 is electrically isolated from vertical signal line VSL by the off-state transistor 42. As a result, the capacitance element (capacitive coupling) 40A is connected to the floating diffusion 6 and a preset capacitance is added to the floating diffusion 6. At this time, for example, boost voltage Vboost is kept at the L (low) level. At this time, the potential of vertical signal line VSL is fixed at a relatively low potential.

Signal level (potential) Vrst of reset control line RST corresponding to the selected row of the pixel array 12 is set to the H level by the vertical shift register 13 based on the operation timing specified by the timing control circuit 15 to turn on the reset transistor 24. As a result, potential FD of the floating diffusion 6 is reset to the potential supplied from power source line VDD. At this time, the read transistor 22 is kept off.

Potential FD of the reset-state floating diffusion 6 is applied to the gate of the amplifier transistor 26. The amplifier transistor 26 is driven according to the magnitude of potential FD of the floating diffusion 6. The potential of vertical signal line VSL varies according to the driving force of the amplifier transistor 26 to which potential FD of the reset-state floating diffusion 6 is applied.

After this, reset control signal Vrst is set from the H level to the L level.

After the reset signal is output to vertical signal line VSL, control signal Voff is transited from the H level to the L level to turn off the transistor 43 in a period before clamp control signal CLP is set to the H level. The power source terminal used for supplying boost voltage Vboost is electrically isolated from the capacitance interconnect 40.

In a period after boost voltage terminal Vboost is isolated from the capacitance interconnect 40 until clamp control signal CLP is set to the H level, control signal Vshunt is transited from the L level to the H level to turn on the transistor 42. As a result, the capacitance interconnect 40 is electrically connected to vertical signal line VSL after the reset signal is output. At this time, the potential of vertical signal line VSL is changed from a relatively low potential to a relatively high potential corresponding to potential FD of the floating diffusion 6.

The potential of the capacitance interconnect 40 after control signal Vshunt is set to the H level (after the interconnect 40 is connected to vertical signal line VSL) is set to a potential higher than the voltage of the capacitance interconnect 40 set when control signal Vshunt is kept at the L level due to the output voltage (the potential of vertical signal line VSL) of the amplifier transistor 26 to which potential FD of the floating diffusion 6 set after resetting is supplied. Since the voltage of the capacitance interconnect 40 is boosted from the low voltage to the high voltage at a timing at which control signal Vshunt is transited from the L level to the H level, potential FD of the floating diffusion that is capacitive-coupled with the capacitance interconnect 40 is changed to a high potential according to the boosted voltage of the capacitance interconnect 40.

Thus, the dynamic ranges of outputs (reset signals) of the floating diffusion 6 and unit cell UC are enlarged. Further, the dynamic range of the image sensor becomes larger and a current supplied to vertical signal line VSL is not increased.

By the control operation of the timing control circuit 131, a clamp signal used for clamping the reset signal of unit cell UC in the CDS circuit 16 is set to the H level and a reset signal output to vertical signal line VSL in a state in which the voltage of the floating diffusion is boosted is clamped by the CDS circuit (CDS unit) 16.

In a period until clamp control signal CLP is set to the H level, signal charges caused by light from the subject are stored in the photodiode 21.

Then, read control signal Vread of the H level is supplied to read control line RD based on the operation timing specified by the timing control circuit 131. As a result, the read transistor 22 is turned on and signal charges stored in the photodiode are transferred from the photodiode 21 to the floating diffusion 6 via the current path (channel) of the on-state read transistor 22.

In the image sensor including unit cells of the two-pixel/ one-cell structure, one of the two read transistors 22A, 22B in unit cell UC is turned on and signal charges are transferred from the photodiode 21 connected to the on-state read transistor 22 that is one of the two photodiodes 21A and 21B in unit cell UC to the floating diffusion 6.

Potential FD of the floating diffusion 6 varies according to an amount of signal charges from the photodiode 21. For example, the potential of the floating diffusion 6 at the signal charge transfer time is lower than the potential of the floating diffusion 6 in the reset state and at the reset signal clamping time.

The varied potential of the floating diffusion 6 is applied to the gate of the amplifier transistor 26. The amplifier transistor 26 is driven with the driving force corresponding to the magnitude (the amount of signal charges from the photodiode 21) of potential FD of the floating diffusion 6. The potential of vertical signal line VSL varies according to the driving force of the amplifier transistor 26 applied with potential FD of the floating diffusion 6 corresponding to the signal charge amount.

An output of the amplifier transistor 26 driven according to potential FD of the floating diffusion 6 in the signal charge holding state is output to vertical signal line VSL as an output (pixel signal) of unit cell UC.

Control signal (sample/hold signal) S/H is set to the H level and a pixel signal output to vertical signal line VSL is sampled by the CDS circuit 16 based on the operation timing specified by the timing control circuit 131.

The reset signal and pixel signal from unit cell UC are subjected to a CDS process by the CDS unit 160 of the CDS circuit 16 and AD-converted by the ADC unit 170 of the ADC circuit 17. Therefore, noise of an output signal (pixel signal) of unit cell UC is eliminated and the output signal of unit cell UC is converted from an analog signal to digital data (digital signal). The thus converted digital data is output to the signal processing circuit 11.

By the same operation, the rows of the pixel array 12 are sequentially switched and digital data corresponding to the reset signal and a pixel signal of unit cell UC belonging to the selected row is obtained based on the control operations of the timing control circuit 15 and vertical shift register 13. The thus obtained data is output to the succeeding-stage signal processing circuit 11 of the image sensor 10.

For example, the digital data from the image sensor 10 is subjected to the lens-shading correction process, damage correction process, noise-reduction process and the like by the signal processing circuit 11. As a result, an image of one frame of the pixel array 12 is formed.

In this example, a case wherein the two photodiodes 21A, 21B in one unit cell UC are connected to the floating diffusion 6 at different operation timings is shown. However, the potentials of two read control lines RDA, RDB may be controlled to simultaneously connect the photodiodes 21A, 21B to the floating diffusion 6 according to the characteristics (for example, light sensitivities) of the photodiodes 21A, 21B and the layout of color filters.

The operation of the image sensor of this embodiment is explained as an example, and the operation of the image sensor can be adequately changed according to the circuit configuration of unit cell UC and the configurations of the pixel array 12 and peripheral circuit if the capacitance interconnect 40 and capacitance element 40A are controlled as described above.

The following effect can be obtained by the operation of the image sensor of this embodiment described above.

In the operation of the image sensor of this embodiment, the capacitance interconnect 40 is electrically isolated from vertical signal line VSL at the output time of a reset signal from unit cell UC and the capacitance of the capacitance element (capacitive coupling) 40A between the capacitance interconnect 40 and the floating diffusion 6 is added to the floating diffusion 6.

The effective capacitance of the floating diffusion 6 is increased by the capacitance element 40A caused by the capacitive coupling between the capacitance interconnect 40 and the floating diffusion 6 at the detection time of the reset signal of the floating diffusion 6.

The capacitance interconnect 40 isolated from vertical signal line VSL is connected to vertical signal line VSL of a certain potential at a timing before the reset signal of the unit cell is clamped to boost the potential of the capacitance interconnect 40. As a result, potential FD of the floating diffusion 6 acting as the signal detector can be boosted by the capacitance element 40A connected between the capacitance interconnect 40 and the floating diffusion 6 in the operation of the image sensor of this embodiment.

Thus, in this embodiment, the potential of the floating diffusion at the reset signal clamping time and before the signal charges are transferred from the photodiode 21 to the floating diffusion 6 becomes higher in comparison with that in a case of a general image sensor.

Therefore, for example, even when a bright subject (highly luminescent subject) is photographed by use of an image sensor in which the capacitance (area) of the floating diffusion is reduced to enhance the S/N ratio at the time of photographing an dark subject and a large number of signal charges are transferred from the photodiode 21 to the floating diffusion 6, the reverse passage of signal charges from the floating diffusion 6 to the photodiode 21 caused by an excessive lowering in the potential of the floating diffusion 6 due to a large number of signal charges and signal charges remaining in the photodiode 21 will almost not occur.

As a result, according to the image sensor of this embodiment, the linearity of the output signal can be maintained in the wide range and an image with the wide dynamic range can be formed.

Therefore, according to the operation of the image sensor of this embodiment, the potential of the floating diffusion 6 can be boosted and the dynamic range of the floating diffusion 6 in the image sensor and the dynamic range of the output of the source follower can be enhanced without increasing the power consumption of the image sensor 10.

In the image sensor of this embodiment, the capacitance interconnect 40 is short-circuited to vertical signal line VSL at the output time of a reset signal used as a reference signal from the unit cell (pixel) and at the output time of a pixel signal. In this embodiment, by short-circuiting the capacitance interconnect 40 and vertical signal line VSL, the effective capacitance between the capacitance interconnect 40 and the floating diffusion 6 is reduced and the capacitance of the floating diffusion 6 to which capacitance CC of the capacitance element 40A is added is effectively reduced. The capacitance of the capacitance element 4A is released from the capacitance of the floating diffusion 6.

As a result, a lowering in the conversion gain caused by the capacitance element (capacitive coupling) connected to the floating diffusion 6 is prevented according to the operation of the image sensor of this embodiment.

Therefore, the quality of an image formed by the image sensor can be enhanced according to the operation example of the image sensor of the first embodiment.

(2) Second Embodiment

A solid-state imaging device of a second embodiment is explained with reference to FIG. 7.

In this case, the second embodiment is explained by also adequately using FIG. 1 to FIG. 6. The same constituents of the second embodiment as the constituents of the first embodiment are denoted by the same reference symbols and explanation of the same constituents is omitted.

The circuit configuration of an image sensor contained in the solid-state imaging device of this embodiment is the same as that of the first embodiment.

FIG. 7 is a timing chart showing an operation example of the solid-state imaging device (for example, image sensor) of the second embodiment. The abscissa of FIG. 7 indicates time and the ordinate of FIG. 7 indicates potentials (signal levels) of respective signals.

As shown in FIG. 7, the operation example of the image sensor of this embodiment is different from the operation example of the image sensor of the first embodiment in that boost voltage Vboost at the detection/output time of a pixel signal acquired by a photodiode 21 is set at an H level.

As shown in FIG. 7, in the image sensor of this embodiment, a transistor 43 is turned on and boost voltage Vboost is transited from an L level to the H level (or a preset level) substantially in synchronism with a timing at which read control signal Vread is set to the H level. Boost voltage Vboost of the H level is supplied to a capacitance interconnect 40 short-circuited to vertical signal line VSL via the on-state transistor 43.

As a result, the potential of the capacitance interconnect 40 is raised and the potential of a floating diffusion 6 is raised via a capacitance element 40A.

The magnitude of boost voltage Vboost is not limited to the H level (VDD) and may be set at an intermediate potential between the H level and the L level (VSS).

In this embodiment, the potential of the floating diffusion 6 is raised when the H level is applied to the gate of a read transistor 22 and signal charges are transferred from the photodiode 21 to the floating diffusion 6.

Therefore, since a larger potential difference occurs between the photodiode 21 and the floating diffusion 6, signal charges will not remain in the photodiode 21.

As the result, in this embodiment, the occurrence of noise in an image such as a residual image caused by charges remaining in the photodiode in an image to be formed can be suppressed.

Like the first embodiment, in the image sensor of the second embodiment and the operation thereof, a lowering in the conversion gain caused by the capacitance element 40A connected to the floating diffusion 6 can be suppressed since the capacitance interconnect 40 is short-circuited to vertical signal line VSL at the detection/read time of a pixel signal from unit cell UC.

As described above, according to the second embodiment, the quality of an image formed by the image sensor can be enhanced like the first embodiment.

(3) Third Embodiment

A solid-state imaging device (for example, image sensor) of a third embodiment is explained with reference to FIG. 8 and FIG. 9.

The same constituents of the third embodiment as the constituents of the first and second embodiments are denoted by the same reference symbols and explanation of the same constituents is omitted.

In the image sensor of the third embodiment, the configuration of interconnects configuring capacitance elements connected to floating diffusions is different from those of the first and second embodiments.

Figure 8:
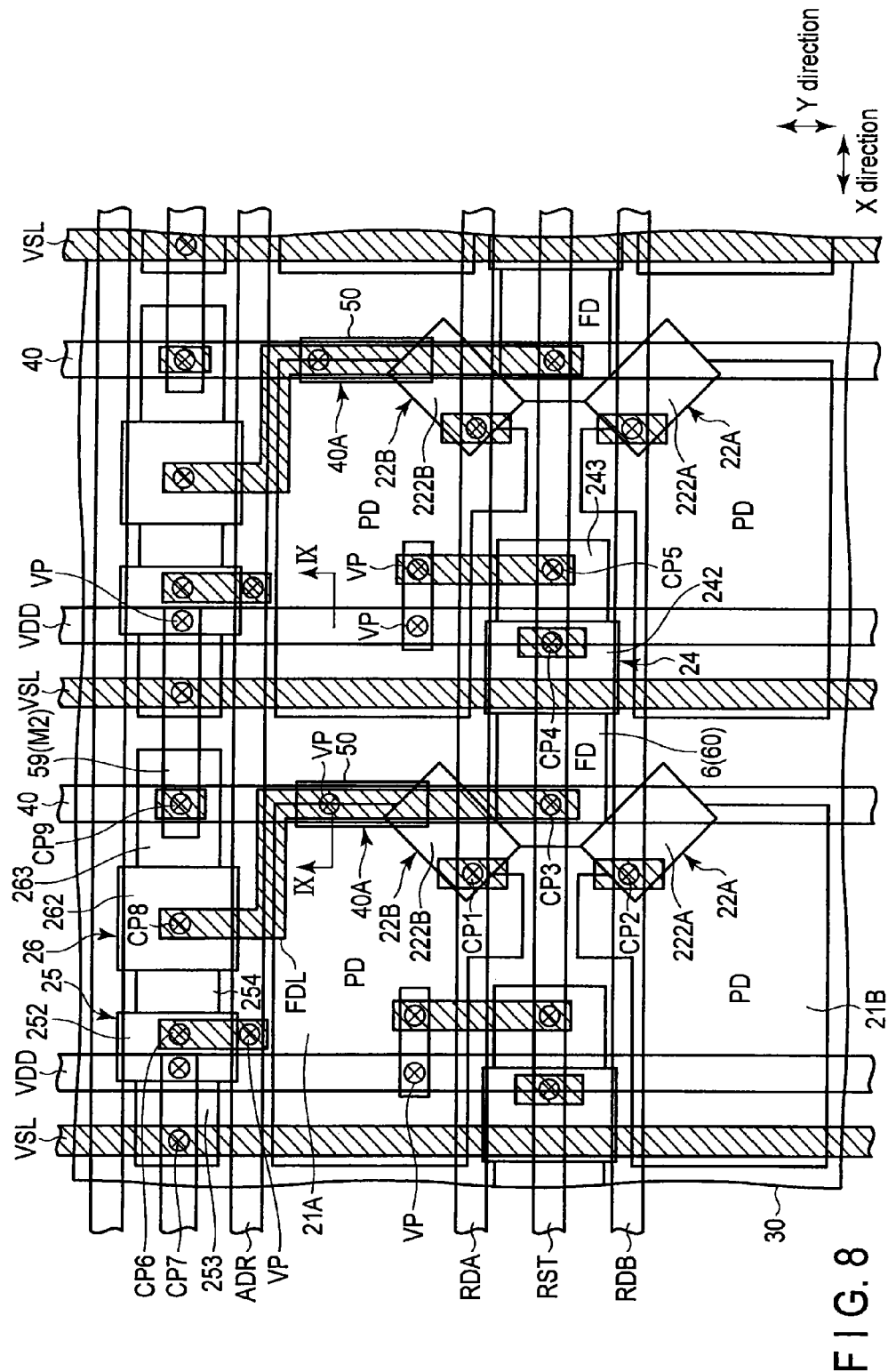
FIG. 8 is a plan view schematically showing a structure example of a solid-state imaging device according to a third embodiment.

FIG. 8 and FIG. 9 are views showing the structure example of the solid-state imaging device of the third embodiment.

FIG. 8 is a plan view showing the plane structure of the image sensor of the third embodiment. FIG. 9 is a cross-sectional view showing the cross-sectional structure of the image sensor of the third embodiment. FIG. 9 shows the cross-sectional structure taken along the IX-IX line of FIG. 8. In FIG. 9, an interlayer insulating film on a semiconductor substrate is omitted.

The image sensor of the third embodiment is different from the image sensor of the first embodiment in that a capacitance interconnect 40 is provided in an interlayer insulating film 90 to arrange the capacitance interconnect 40 adjacent to signal detection line FDL in a direction perpendicular to the front surface of the semiconductor substrate.

For example, a capacitance interconnect 40 is provided at third interconnect level M3 above a first interconnect level at which signal detection line FDL is provided.

The capacitance interconnect 40 is provided at third interconnect level M3 to overlap signal detection line FDL in a direction perpendicular to the front surface of the semiconductor substrate 30.

An intermediate interconnect 50 is provided between the capacitance interconnect 40 and signal detection line FDL. The intermediate interconnect 50 is provided at second interconnect level M2. The arrangement position of the intermediate interconnect 50 in a pixel array 12 overlaps the capacitance interconnect 40 and signal detection line FDL in a direction perpendicular to the front surface of the semiconductor substrate 30. The intermediate interconnect 50 is connected to the capacitance interconnect 40 via plug VP. No connection is made between the intermediate interconnect 50 and signal detection line FDL via a conductive body (for example, plug).

Capacitive coupling occurs between the intermediate interconnect 50 and signal detection line FDL. Capacitive coupling occurring between the intermediate interconnect 50 and signal detection line FDL functions as the capacitive element 40A connected between the floating diffusion and the capacitance interconnect 40.

If the intermediate interconnect 50 overlaps signal detection line FDL to form capacitive coupling of preset capacitance CC between the intermediate interconnect 50 and signal detection line FDL, the entire portion of the capacitance interconnect 40 connected to the intermediate interconnect 50 may not overlap signal detection line FDL. The capacitance interconnect 40 may be provided at second interconnect level M2 to overlap signal detection line FDL in a direction perpendicular to the front surface of the semiconductor substrate 30 without providing the intermediate interconnect 50. In this case, capacitive coupling functioning as the capacitive element 40A occurs between signal detection line FDL provided at first interconnect level M1 and the capacitance interconnect 40 provided at second interconnect level M2.

The number of interconnects at an interconnect level (for example, at the first interconnect level) at which the signal detection line is provided can be reduced and the degree of freedom of the interconnect designing layout can be enhanced by providing the capacitance interconnect 40 at an interconnect level different from the interconnect level at which the signal detection line is provided.

For example, the capacitance interconnect 40 is provided at an interconnect level different from the first interconnect level at which vertical signal line VSL is provided and the capacitance interconnect 40 is separated from vertical signal line VSL. Therefore, parasitic capacitance between the capacitance interconnect 40 and vertical signal line VSL can be reduced. As a result, the occurrence of noise in vertical signal line VSL caused by parasitic capacitance between the capacitance interconnect 40 and vertical signal line VSL can be suppressed.

The operation of the image sensor described in the first and second embodiments can be applied to the image sensor of this embodiment.

As described above, according to the solid-state imaging device of the third embodiment, the quality of an image formed by the image sensor can be enhanced like the solid-state imaging device of the first embodiment.

(4) Modification

A modification of the solid-state imaging device of the above embodiment is explained with reference to FIG. 10 and FIG. 11. The same constituents of the solid-state imaging device of this modification as the constituents of the first and second embodiments are denoted by the same reference symbols and explanation of the same constituents is made as required.

The circuit configuration of a pixel array of an image sensor may have the one-pixel/one-cell structure.

Figure 11:
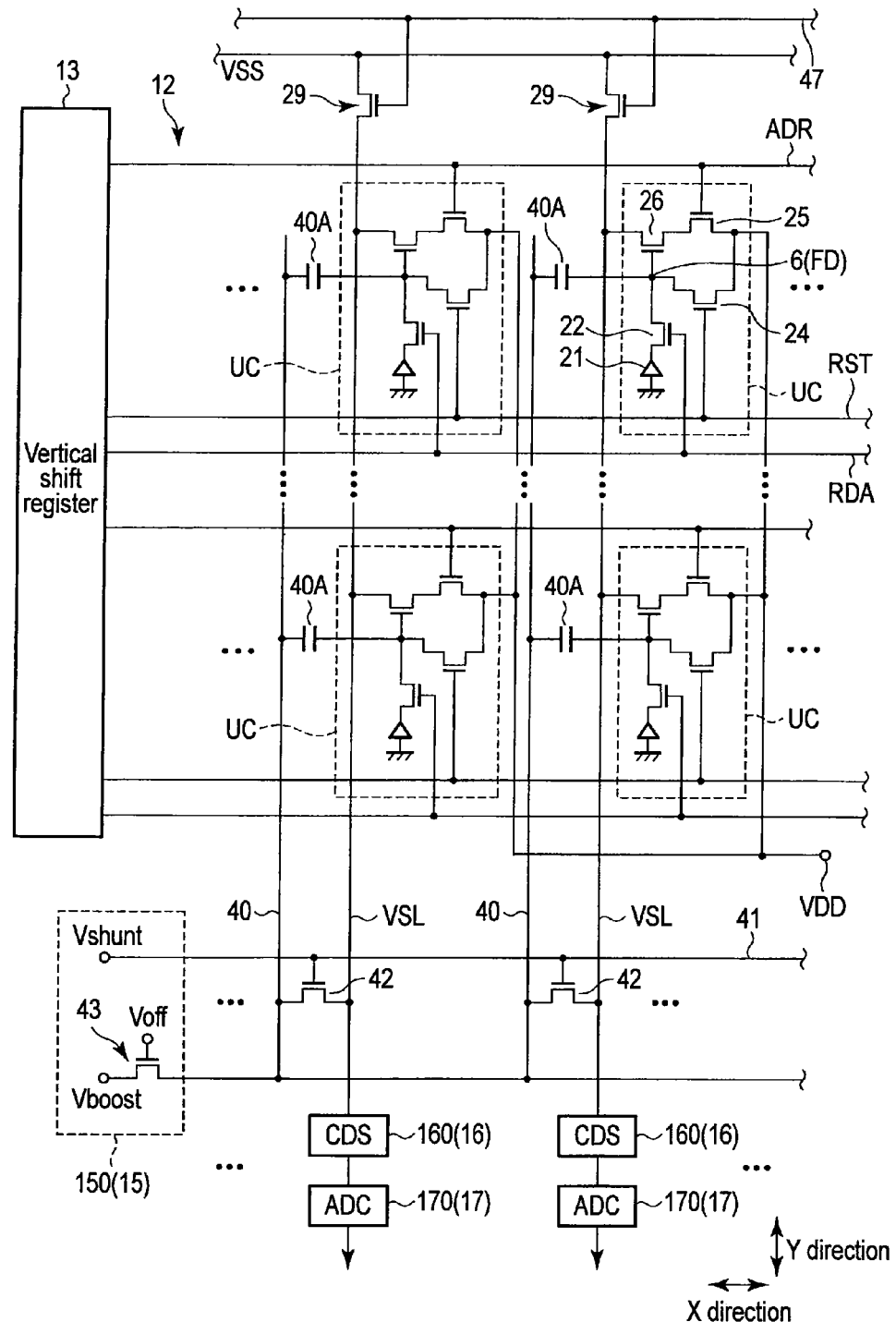

FIG. 10 and FIG. 11 are equivalent circuit diagrams showing the circuit configurations of pixel arrays of the one-pixel/one-cell structure in the modifications of the image sensor of this embodiment.

As shown in FIG. 10, the number of photodiodes 21 included in unit cell UC of the one-pixel/one-cell structure is one. Further, one read transistor 22 is provided in the unit cell to correspond to the photodiode 21.

As shown in FIG. 11, the connection order of an amplifier transistor 26 and address transistor 25 can be reversed with respect to the example shown in FIG. 10.

In an image sensor 10 of FIG. 11, one end of the current path of the amplifier transistor 26 is directly connected to vertical signal line VSL and the other end of the current path of the amplifier transistor 26 is connected to power source terminal VDD via the current path of the address transistor 25. The current path of the address transistor 25 is connected to vertical signal line VSL via the current path of the amplifier transistor 26.

It is not required for each unit cell UC to include the address transistor 25. If the unit cell UC does not contain the address transistor 25, address signal line ADR is not provided.

Each unit cell UC may have the circuit configuration (multiple-pixel/one-cell structure) including three or more pixels (photodiodes) such as the four-pixel/one-cell structure or eight-pixel/one-cell structure. In the unit cell including a plurality of pixels, three or more photodiodes commonly use one floating diffusion and reset transistor, amplifier transistor and address transistor. In the unit cell including a plurality of pixels, one read transistor is provided for each photodiode.

Also, in the image sensors shown in FIG. 10 and FIG. 11, capacitance interconnects 40 are provided in the image sensor 10 and capacitance elements 40A are connected between the capacitance interconnect 40 and respective floating diffusions 6.

At the operation time of the image sensors shown in FIG. 10 and FIG. 11, the capacitance interconnect 40 is electrically isolated from vertical signal line VSL at the output time of a reset signal from unit cell UC. Therefore, the potential of the floating diffusion 6 can be boosted and the dynamic range can be enlarged by the capacitance element 40A connected to the floating diffusion 6.

At the time of a pixel signal from unit cell UC, the capacitance interconnect 40 is electrically connected to vertical signal line VSL. As a result, a lowering in the conversion gain caused by the capacitance element 40A connected to the floating diffusion 6 can be prevented.

As described above, the image quality of the image sensor can be enhanced like the above embodiment even if the internal structure of the unit cell is changed as in the image sensors of the modifications shown in FIG. 10 and FIG. 11.

(5) Application Example

An application example of the solid-state imaging device according to the embodiment is explained with reference to FIG. 12.

Figure 12:
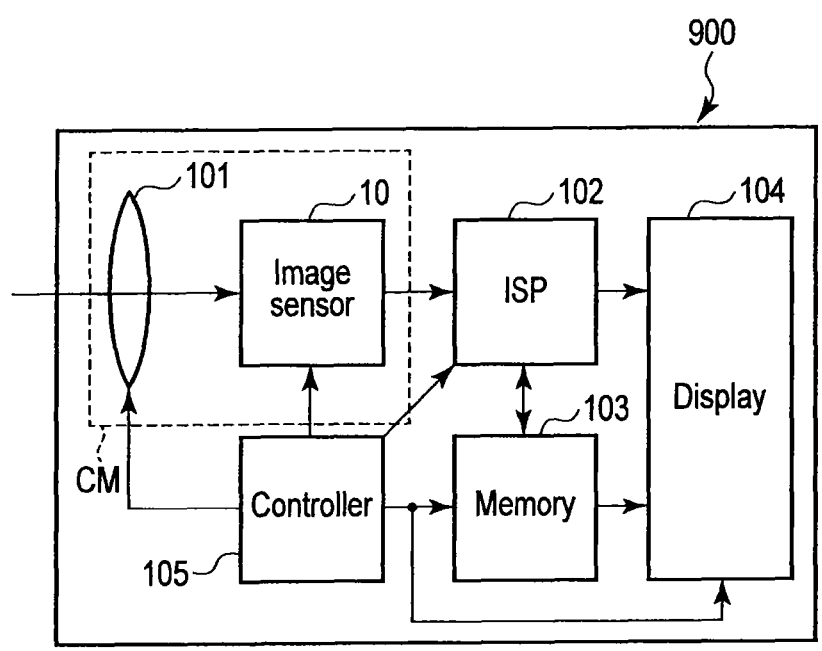
FIG. 12 is a diagram for illustrating an application example of the solid-state imaging device of the above embodiment.

FIG. 12 is a schematic diagram for illustrating the application example of the solid-state imaging device of the above embodiment.

FIG. 12 is a block diagram showing the configuration example of a digital camera and a camera module including the solid-state imaging device (for example, image sensor) 10 of this embodiment.

The image sensor 10 of each embodiment is formed in a module form and mounted in a digital camera 900. In the following description, a module including the image sensor 10 of this embodiment is called a camera module.

As shown in FIG. 12, camera module CM including the image sensor 10 of this embodiment (and a signal processing circuit) is mounted in the digital camera 900.

The digital camera 900 includes an image processing circuit (ISP) 102, memory 103, display 104 and controller 105.

Camera module CM of FIG. 12 includes an optical lens unit (photographing optical system) 101 in addition to the image sensor 10.

The optical lens unit 101 condenses incident light (light from the subject) on the image sensor 10 of this embodiment and forms a subject image corresponding to the incident light on the image sensor 10. The optical lens unit 101 includes a plurality of lenses. The optical characteristic (for example, focal distance) of the optical lens unit 101 can be controlled by performing the mechanical or electrical control operation for each lens.

The ISP 102 processes a pixel signal obtained by the photographing operation of camera module CM. The memory 103 stores a signal from the ISP 102. The memory 103 can also store a signal and data supplied from the exterior. Data subjected to a signal process by the ISP 102 is feedback-controlled in camera module CM. The signal processing circuit 11 of FIG. 1 may be provided in the ISP 102.

A signal from the ISP 102 or a signal from the memory 103 is displayed on the display (for example, liquid crystal display) 104. The signal output from the ISP 102 and memory 103 to the display 104 is image data (still picture data or motion picture data) corresponding to light from the subject acquired by the image sensor 10. The controller 105 controls the respective constituents 101 to 104 in the digital camera 900.

For example, camera module CM is applied to a mobile terminal with a camera, a personal computer with a camera and an electronic device such as an onboard camera in addition to the digital camera 900.

As described above, the solid-state imaging device of the present embodiment can be applied to a camera module and digital camera.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
   unit cells arranged in a matrix form in a pixel array, each of the unit cells including a photoelectric conversion element that generates signal charges based on incident light, a signal detector that detects a signal of the photoelectric conversion element and an amplifier transistor connected to the signal detector;
   vertical signal lines, each of the vertical signal lines supplied with a reset signal of each of the unit cells in a reset state of the signal detector and a pixel signal of each of the unit cells in a signal charge holding state of the signal detector via each of the amplifier transistors;
   first interconnects, each of the first interconnects connected to each of the signal detectors via each of capacitance elements;
   second interconnects, each of the second interconnects connected between each of the signal detectors and each of the amplifier transistors; and
   switch elements, each of the switch elements provided between each of the vertical signal lines and each of the first interconnects, wherein
   unit cells arranged in a column direction among the unit cells arranged in the matrix form are connected to a common vertical line among the vertical signal lines and a common first interconnect among the first interconnects, and
   a selected first interconnect among the first interconnects is electrically isolated from a selected vertical signal line among the vertical signal lines when the reset signal is supplied from a selected unit cell among the unit cells to the selected vertical signal line, the selected first interconnect is connected to the selected vertical signal line before the reset signal is sampled, and the pixel signal is supplied from the selected unit cell to the selected vertical signal line and the pixel signal supplied to the selected vertical signal line is sampled while the selected first interconnect is connected to the selected vertical signal line.

2. The solid-state imaging device according to claim 1, further comprising:
   a boost circuit supplying a boost voltage to the first interconnects.

3. The solid-state imaging device according to claim 2, wherein
   the boost circuit is commonly connected to the first interconnects.

4. The solid-state imaging device according to claim 1, further comprising:
   a control line commonly connected to each of the switch elements and controlling for the switch elements.

5. A solid-state imaging device comprising:
a unit cell including a photoelectric conversion element that generates signal charges based on incident light and a signal detector that detects a signal of the photoelectric conversion element;
a vertical signal line supplied with a reset signal of the unit cell in a reset state of the signal detector and a pixel signal of the unit cell in a signal charge holding state of the signal detector; and
a first interconnect connected to the signal detector via a capacitance element;
wherein the first interconnect is electrically isolated from the vertical signal line when the reset signal is supplied from the unit cell to the vertical signal line, the first interconnect is connected to the vertical signal line before the reset signal is sampled, and the pixel signal is supplied from the unit cell to the vertical signal line and the pixel signal supplied to the vertical signal line is sampled while the first interconnect is connected to the vertical signal line.

6. The solid-state imaging device according to claim 5, wherein a voltage higher than a reference potential is applied to the first interconnect when the signal charges are supplied to the signal detector.

7. The solid-state imaging device according to claim 5, wherein a reference potential is applied to the first interconnect when the pixel signal is supplied from the unit cell to the vertical signal line.

8. The solid-state imaging device according to claim 5, wherein the unit cell includes a first transistor having a gate connected to the signal detector via a second interconnect and a current path connected to the vertical signal line.

9. The solid-state imaging device according to claim 8, wherein the capacitance element is formed of capacitive coupling between the first interconnect and the second interconnect.

10. The solid-state imaging device according to claim 5, wherein a capacitance of the capacitance element is added to the signal detector when the first interconnect is electrically isolated from the vertical signal line.

11. The solid-state imaging device according to claim 5, wherein a capacitance of the capacitance element is released from the signal detector when the first interconnect is connected to the vertical signal line.

\* \* \* \* \*